(12) United States Patent
Dubois et al.

(10) Patent No.: US 7,663,264 B2
(45) Date of Patent: Feb. 16, 2010

(54) ELECTRIC SUPPLY FOR AN AIRCRAFT GAS TURBINE ENGINE EQUIPMENT

(75) Inventors: Gilles Guy Dubois, Draveil (FR); Régis Bernard Albert Meuret, Chatou (FR); Maurice Georges Vernochet, La Rochette (FR)

(73) Assignee: Hispano Suiza, Colombes (FR)

( * ) Notice: Subject to any disclaimer, the term of this patent is extended or adjusted under 35 U.S.C. 154(b) by 101 days.

(21) Appl. No.: 11/816,423

(22) PCT Filed: Feb. 17, 2006

(86) PCT No.: PCT/EP2006/060075

§ 371 (c)(1),
(2), (4) Date: Oct. 26, 2007

(87) PCT Pub. No.: WO2006/087379

PCT Pub. Date: Aug. 24, 2006

(65) Prior Publication Data

US 2008/0258560 A1    Oct. 23, 2008

(30) Foreign Application Priority Data

Feb. 17, 2005    (FR)    .................................. 05 01642

(51) Int. Cl.
*B60L 1/00* (2006.01)
(52) U.S. Cl. .......................................... 307/9.1; 307/64
(58) Field of Classification Search ................... 307/43, 307/9.1, 64
See application file for complete search history.

(56) References Cited

U.S. PATENT DOCUMENTS

| | | | |
|---|---|---|---|
| 4,927,329 A * | 5/1990 | Kliman et al. ............... | 416/127 |
| 5,233,286 A | 8/1993 | Rozman et al. | |
| 5,764,502 A | 6/1998 | Morgan et al. | |
| 5,929,537 A | 7/1999 | Glennon | |
| 7,439,634 B2 * | 10/2008 | Michalko ..................... | 307/43 |
| 2004/0119454 A1 | 6/2004 | Chang et al. | |

OTHER PUBLICATIONS

Maldonado, Miguel A. et al., "Power Management and Distribution System for Amore-Electric Aircraft (MADMEL)—Program Status", Intersociety Energy Conversion Engineering Conference (IECEC), vol. 1, pp. 13-18, 1995.

Niggemann, R.E. et al., "270-VDC/Hybrid 115-VAC Electric Power Generating System Technology Demonstrator", Aerospace and Electronics Conference, pp. 448-454, 1991.

* cited by examiner

*Primary Examiner*—Robert L. Deberadinis
(74) *Attorney, Agent, or Firm*—Oblon, Spivak, McClelland, Maier & Neustadt, L.L.P.

(57) ABSTRACT

A device supplying electricity power to and actuating equipments of a gas turbine airplane engine, including an electricity power supply circuit dedicated to the engine and distinct from an electricity network on board the plane and excitation, control or servo circuits for pieces of electrical equipment of the engine. The engine electrical power supply circuit includes a first bus distributing DC or AC voltage to excitation, control or servo circuits for first pieces of electrical equipment of the engine, a second bus distributing DC or AC voltage to excitation, control or servo circuits for other pieces of electrical equipment of the engine requiring higher electrical power compared with the first pieces of equipment, and a third bus connected to receive power from an electricity source such as an airplane on-board electricity distribution network or an electricity generator dedicated to the engine and driven thereby. The third bus supplies the first and second bus with electricity power.

12 Claims, 9 Drawing Sheets

ELECTRIC SUPPLY FOR AN AIRCRAFT GAS TURBINE ENGINE EQUIPMENT

BACKGROUND OF THE INVENTION

The invention relates to electrically powering equipment of gas turbine airplane engines.

Figure 1:
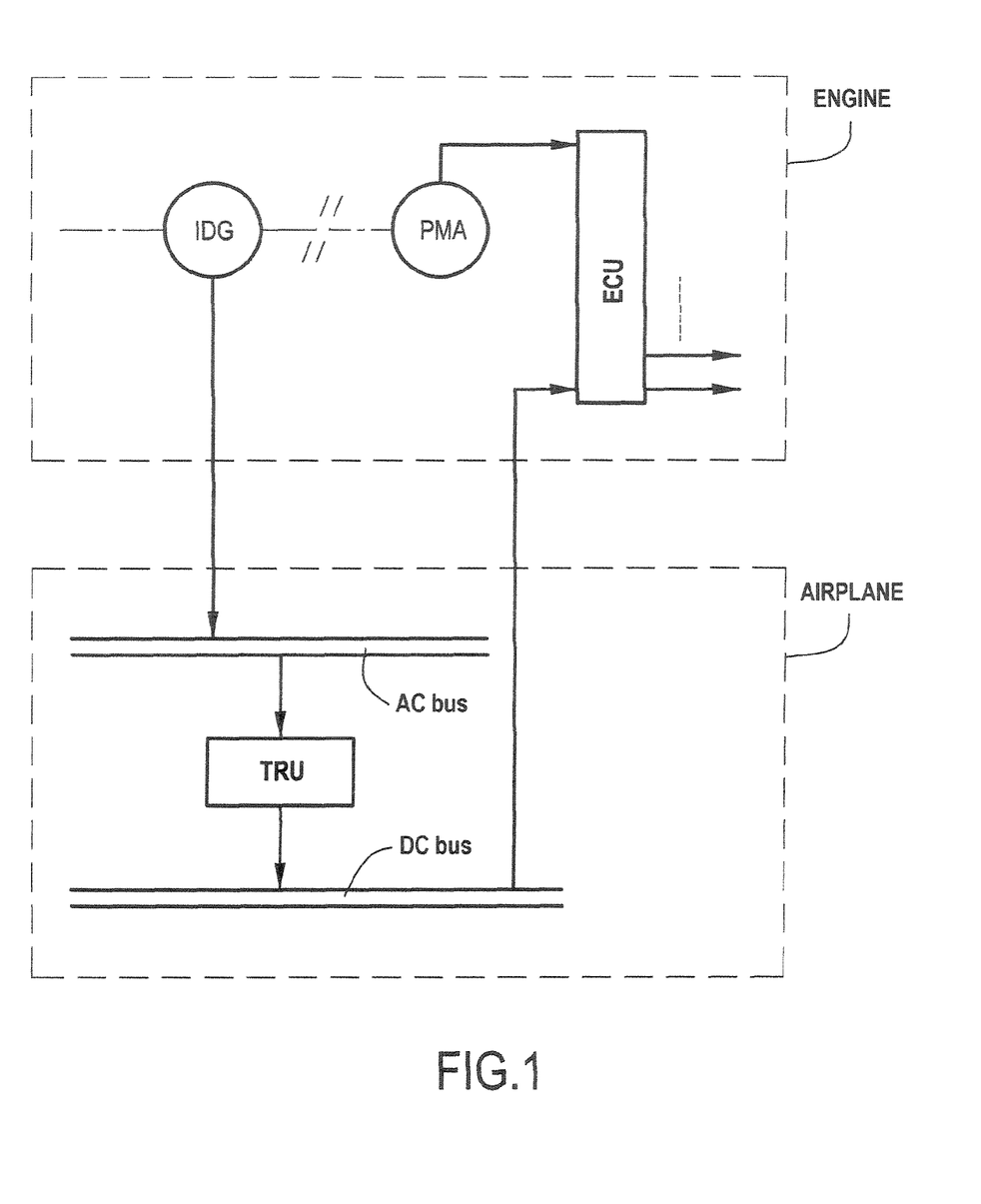
FIG. 1, described above, is a highly diagrammatic representation of one known way of generating and distributing electricity for an airplane electricity circuit and an airplane engine electricity circuit.

A traditional circuit for producing electricity from a gas turbine airplane engine is shown in FIG. 1.

A generator such as an integrated drive generator (IDG) is driven by the engine and delivers electricity to an alternating current bus (AC bus) forming part of the electricity distribution circuit of the airplane. The circuit usually also includes a direct current bus (DC bus) powered from the AC bus via a transformer-rectifier unit (TRU). Particular systems for producing and distributing electricity in airplane electricity networks are described in the following documents in particular: U.S. Pat. No. 5,764,502, U.S. Pat. No. 5,233,286, US 2004/119454, and EP 0 838 396.

Once the engine reaches a certain speed, a full-authority electronic control unit (ECU) module associated with the engine is powered by a generator such as permanent magnet alternator (PMA) mounted on an equipment box mechanically coupled to a turbine shaft of the engine. The ECU is also connected to the DC bus as shown, or in a variant to the AC bus of the airplane electricity circuit in order to be powered until sufficient engine speed has been reached to enable the PMA to deliver the electricity required, or in the event of the PMA failing.

A circuit analogous to that shown in FIG. 1 is to be found in association with each engine of the airplane, thus making a plurality of electricity sources available.

The ECU uses the electricity it receives to enable its components to operate and to excite various members of the engine, such as probes or sensors, electrically-controlled valves, or servo-valves that require only limited amounts of electrical power. As a general rule, the ECU comprises two redundant identical portions (1/2 ECU), or channels.

OBJECT AND SUMMARY OF THE INVENTION

The invention relates more precisely to the electrical circuits of gas turbine engines, rather than to airplane electrical circuits in general, and its purpose is to provide a novel architecture for distributing electricity in a gas turbine airplane engine, that is particularly suitable when it is desired for an increasing number of pieces of engine equipment to use electricity to make them operate instead of using hydraulic power.

This object is achieved by an electricity power supply circuit for a gas turbine airplane engine, the circuit having at least three electricity power supply buses comprising a first bus for distributing DC or AC to first pieces of electrical equipment of the engine, a second bus for distributing DC or AC at higher voltage to other pieces of electrical equipment of the engine, the first and second buses being connected to a third bus, itself being connected to at least one electricity source.

The electrical power needed can be taken from the electricity distribution network of the airplane. The presence of a specific generator for feeding electricity to the engine is no longer required. Since the electricity consumption in airplanes is increasing, ever greater levels of electrical power need to be delivered to the airplane electricity network. The electrical power needed by the engine is then small compared with the power needed by the network on board the airplane, so it can be taken from that network without any major drawback.

Nevertheless, it remains possible to use a special source, such as a generator dedicated to the engine and driven thereby in order to deliver the electrical power needed to allow the engine to run completely independently.

When the electricity source is an AC source, such as the electricity network on board an airplane (e.g. 115 volts (V) AC or 230 Vac at 400 hertz (Hz) or at variable frequency), or a generator dedicated to the engine, various embodiments of the electricity power supply device of the engine can be envisaged:

a first embodiment in which the first bus is an AC distribution bus connected to the third bus by a transformer and advantageously a circuit breaker, while the second bus is an AC distribution bus that may be connected to the third bus merely via a circuit breaker, the voltage on the second bus being the same as the voltage available on the third bus;

a second embodiment in which the first bus is a DC distribution bus connected to the first bus via a voltage converter or transformer-rectifier, and advantageously a circuit breaker, while the second bus is an AC distribution bus that may be connected to the third bus merely via a circuit breaker, as in the first embodiment;

a third embodiment in which the first bus is a DC distribution bus as in the second embodiment, while the second bus is a DC distribution bus connected to the third bus via a voltage converter or a transformer-rectifier, and advantageously a circuit breaker; and a fourth embodiment in which the first bus is an AC distribution bus as in the first embodiment and the second bus is a DC distribution bus as in the third embodiment.

It can be observed that in the first and second embodiments, the second bus may be connected to the third bus via a transformer when the voltage desired on the second bus is different from that available on the third bus.

When the electricity source is a DC source, such as an electricity network on board an airplane (e.g. at 270 Vdc), a fifth embodiment of the engine and electricity power supply device can be envisaged in which the first bus is a DC distribution bus connected to the third bus via a voltage converter, and advantageously by a circuit breaker, while the second electricity distribution bus can be connected to the third bus merely via a circuit breaker, the voltage on the second bus being the same as that available on the third bus. A voltage converter could nevertheless also be provided between the second bus and the third bus when the voltage desired on the second bus is different from that available on the third bus.

The first power supply bus is preferably used for powering first pieces of electrical equipment that require power that is less than 100 watts (W), for example. The first pieces of electrical equipment may comprise one or more items selected from an electronic regulator module for the engine, valves for controlling the overall flow rate of fuel delivered to the engine, a system for managing the health and the usage of members of the engine, compressor transient bleed valves, valves for controlling the flow rate of fuel delivered to combustion chamber injectors of the engine, valves for controlling air flow rate to adjust clearance at the tips of turbine blades, and a device for igniting combustion.

The other pieces of electrical equipment may comprise one or more items selected from: devices for controlling the pitch angle of variable pitch vanes, adjustable bleed valves for a compressor, and a pump of a circuit for supplying fuel to the engine.

According to a feature of the electricity power supply device of the invention, the electrical equipment of the engine is associated with electronic circuits for excitation, control, or servo-control, and at least some of the electronic circuits are implanted locally in the corresponding pieces of equipment and integrated therein and are powered by the electricity power supply bus.

In a variant of the electricity supply power device in accordance with the invention, systems for adjusting clearance at the tips of turbine blades include electrical heater devices powered directly by the third bus.

BRIEF DESCRIPTION OF THE DRAWINGS

The invention can be better understood on reading the following description given by way of non-limiting indication and with reference to the accompanying drawings, in which.

DETAILED DESCRIPTION OF AN EMBODIMENT OF THE INVENTION

In FIGS. 2 to 6, references 10 and 20 designate the perimeters respectively of an airplane and of a gas turbine engine fitted to the airplane.

As shown, one or two electricity generators 21 are driven by the engine 20 to provide the electricity needed for the electricity distribution network of the airplane. Advantageously, electrical machines are used that are capable of acting as electric starters and then as generators when driven by the turbine of the engine, where such machines are commonly referred to as starter/generators (S/G). For redundancy purposes, one or two similar generators driven by another engine of the airplane likewise deliver electricity to the electricity distribution network of the airplane, in parallel with the generators 21, so as to have redundant sources of electricity on board the airplane. The electricity delivered is converted in the electricity distribution network of the airplane into alternating current typically at 115 Vac or 230 Vac at 400 Hz or at variable frequency, or as direct current, typically at 270 Vdc.

The electricity needed for operating the electrical equipment of the engine is taken from the electricity distribution network of the airplane by power supply lines 12, 12'.

Figure 2:
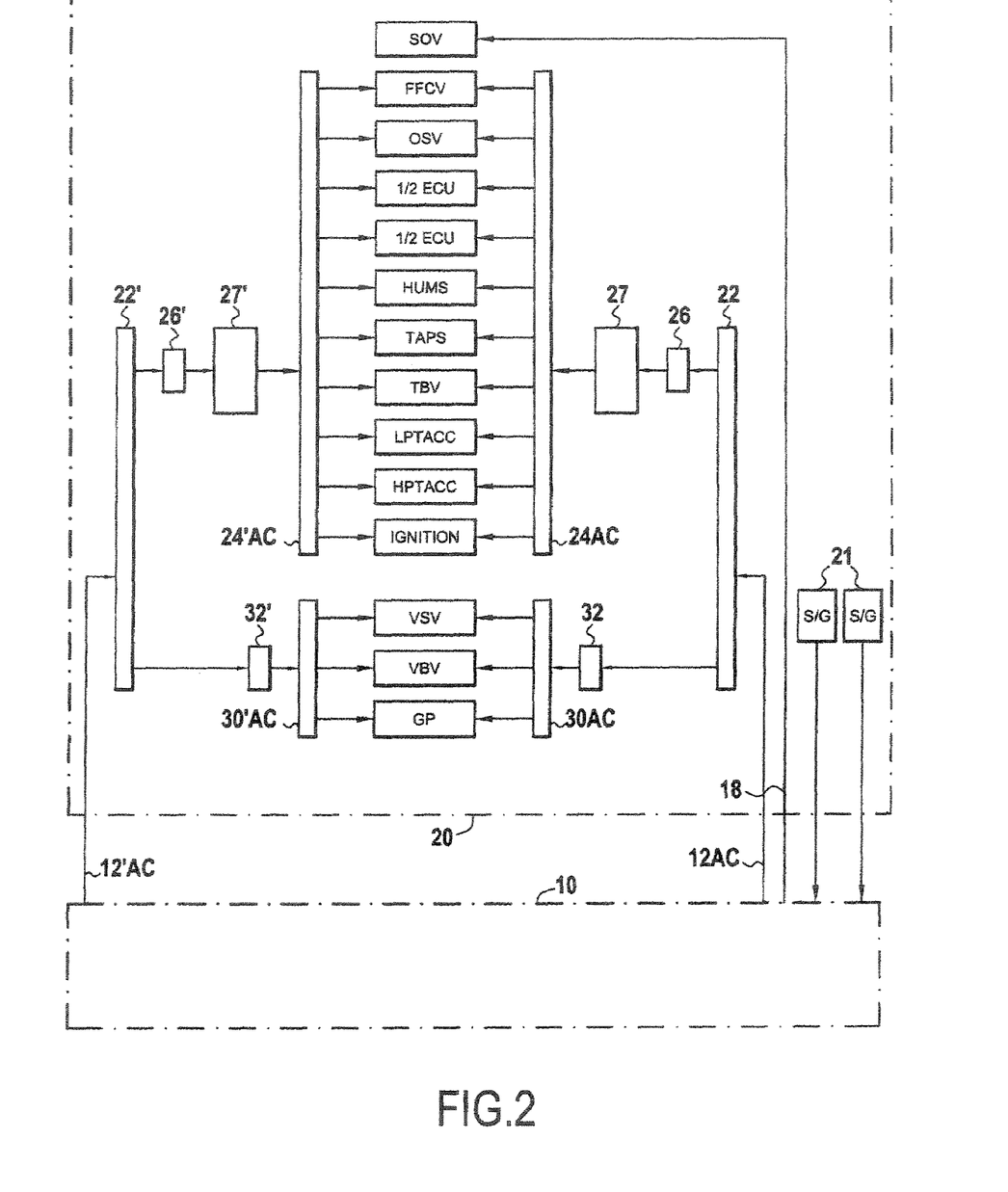
FIGS. 2 to 6 are highly diagrammatic showing various embodiments of an airplane engine electricity power supply circuit in accordance with the invention.

In the embodiment of FIG. 2, the power supply lines 12, 12' deliver AC.

The power supply line 12 is connected directly to a bus 22 of the electricity power supply circuit of the airplane. A first bus 24AC for distributing AC is connected to the bus 22 via a circuit breaker 26 and a transformer 27. The transformer 27 transforms the AC delivered by the airplane electricity distribution network via the bus 22 into AC of lower amplitude, e.g. at a voltage of about 115 Vac. A second bus 30AC for distributing AC is connected to the bus 22 via a circuit breaker 32.

The bus 24AC is used for delivering the electricity needed for operating or actuating engine equipment that requires relatively low power, typically less than 100 watts (W). Such equipment may comprise one or more of the following items:

a redundant full-authority electronic control unit (ECU) of the engine, represented in the figure by two identical circuits (one of which is redundant) labeled "1/2 ECU";

a fuel flow control valve (FFCV) of a circuit for regulating the general flow rate of fuel delivered to the engine, such as, for example, an electrically-controlled direct-control valve;

an over-speed valve (OSV) of the circuit for regulating the general flow rate of fuel delivered to the engine, to protect it against excess speed, such as, for example, an electrically-controlled direct-control valve;

a health and usage management system (HUMS) for the members of the engine that delivers information useful in diagnosing breakdowns and for maintenance of members of the engine;

valves of a system for controlling the flow rate of fuel delivered to injectors of the combustion chamber of the engine, such as a twin annular pre-switch (TAPS) combustor;

transient bleed vanes (TBV), i.e. valves that are operated during particular stages of flight, in particular during takeoff;

air flow rate control valves for systems that control the clearance at the tips of the rotor blades in the high pressure turbine and low pressure turbine, known respectively as low pressure turbine active clearance control (LPTACC) and high pressure turbine active clearance control (HPTACC); and an ignition device for controlling ignition of the engine by means of a spark plug.

The bus 30AC is used to deliver the electricity needed for actuating engine equipment that requires relatively high power. Such equipment may comprise one or more of the following items:

devices for controlling the pitch angle of the vanes in a stator having variable stator vanes (VSV), i.e. the vanes of nozzle and compressor stages;

variable bleed valves (VBV) for adjusting compressor bleed discharge, i.e. valves suitable for being controlled throughout the duration of a flight; and an electric pump of a general fuel supply circuit of the engine, in particular a volumetric gear pump (GP).

For redundancy purposes, the power supply line 12' is connected directly to a bus 22' that distributes AC symmetrically to the bus 22, but on a bus 24'AC via a circuit breaker 26, and a transformer 271 that delivers AC on a bus 30'AC via a circuit breaker 321. The equipment powered by the buses 24'AC and 30'AC is the same as the equipment powered by the buses 24AC and 30AC.

Naturally, the equipment lists given above are not exhaustive.

Figure 3:
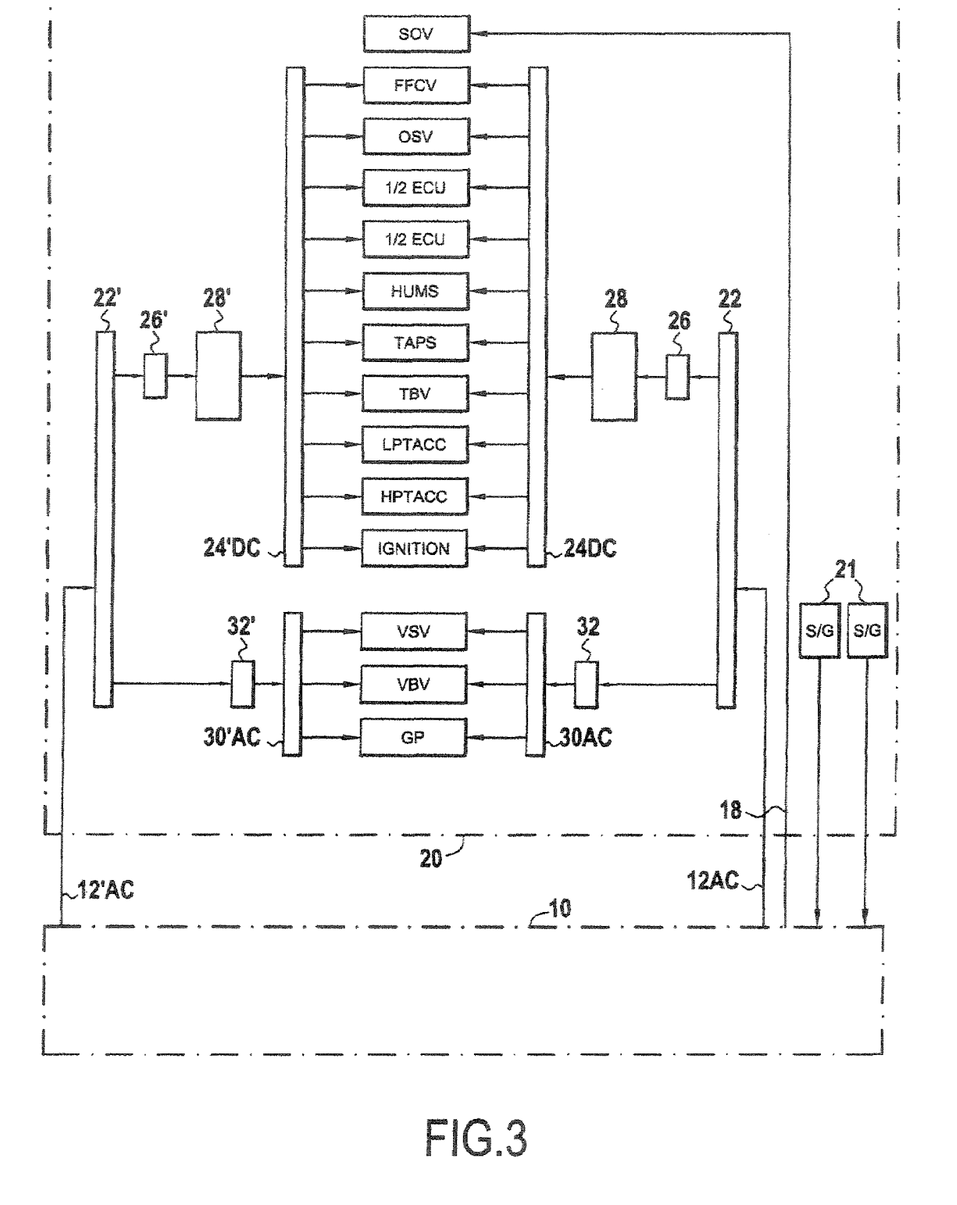

FIG. 3 shows a second embodiment of the engine electricity power supply circuit that differs from the embodiment of FIG. 2 in that the first bus is a bus 24DC for distributing DC that is connected to the bus 22 via the circuit breaker 26 and a voltage converter circuit 28. The converter 28 transforms the AC delivered by the bus 22 into DC at lower amplitude, e.g. at a voltage of about 28 Vdc. A secure converter 28 is advantageously used that provides protection against transient power line disturbances so as to maintain the power supply on the bus 24DC in the event of transient disturbances in the received AC. Similarly, the bus 22' is connected to a DC bus 24'DC via the circuit breaker 26' and a voltage converter 28', the bus 24'DC powering the same equipment as the bus 24DC.

Figure 4:
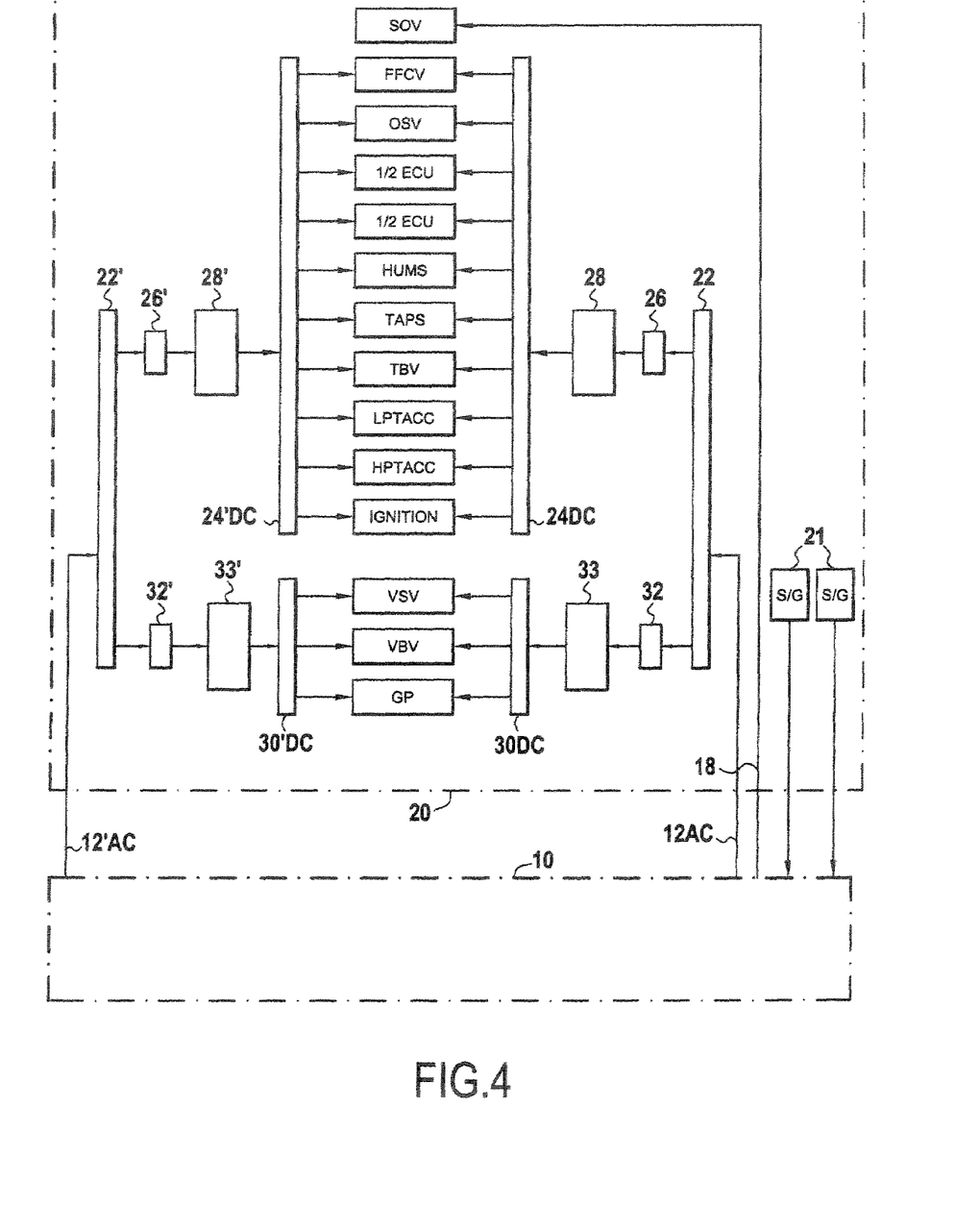

FIG. 4 shows a third embodiment of the engine electricity power supply circuit that differs from the embodiment of FIG. 3 in that the second bus is a DC distribution bus 30DC connected to the bus 22 via the circuit breaker 32 and a transformer-rectifier or converter 33, preferably made secure against transient disturbances. The transformer-rectifier or converter 33 transforms the AC on the bus 22 into DC (e.g. at a voltage of 270 Vdc when the bus 22 distributes 115 Vac). In similar manner, the bus 22, is connected to a DC bus 30'DC via the circuit breaker 32, and a transformer-rectifier or converter 331, the bus 30'DC feeding the same equipment as the bus 30DC.

Figure 5:
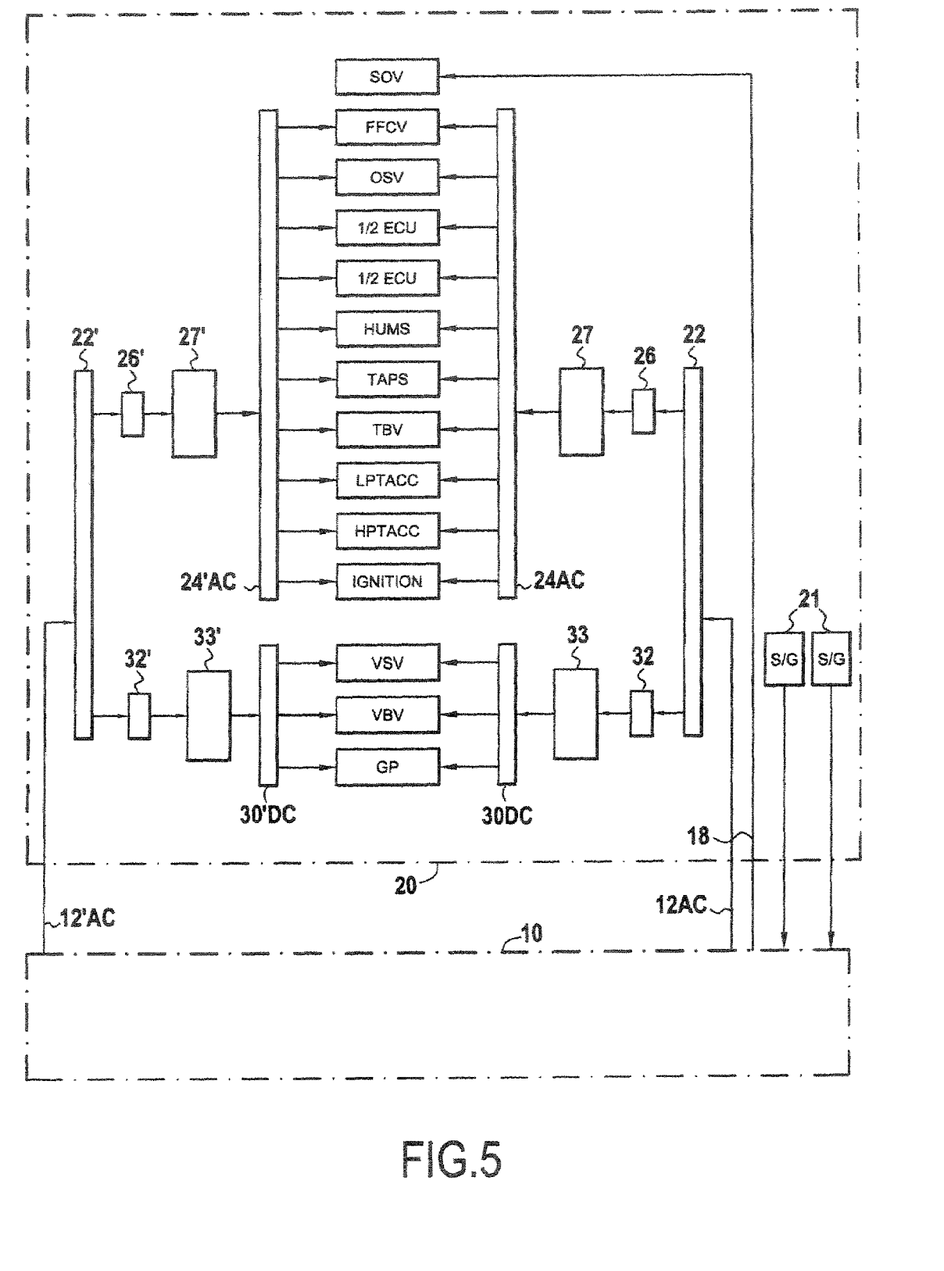

FIG. 5 shows a third embodiment of the engine electricity power supply circuit that differs from the embodiment of FIG. 2 in that the second bus is a DC distribution bus 30DC as shown in FIG. 4, powered from the bus 22 via the circuit breaker 32 and the transformer-rectifier or converter 33, preferably made secure against transient disturbances. Similarly, a bus 30'DC is powered from the bus 22' via the circuit breaker 32, and the transformer-rectifier or converter 33'.

It should be observed in the embodiments of FIGS. 2 and 3, the buses 30AC and 30'AC could be connected to the buses 22, 22, via transformers if the voltages desired on the buses 30AC and 30'AC are different from the voltages available on the buses 22 and 22'.

Figure 6:
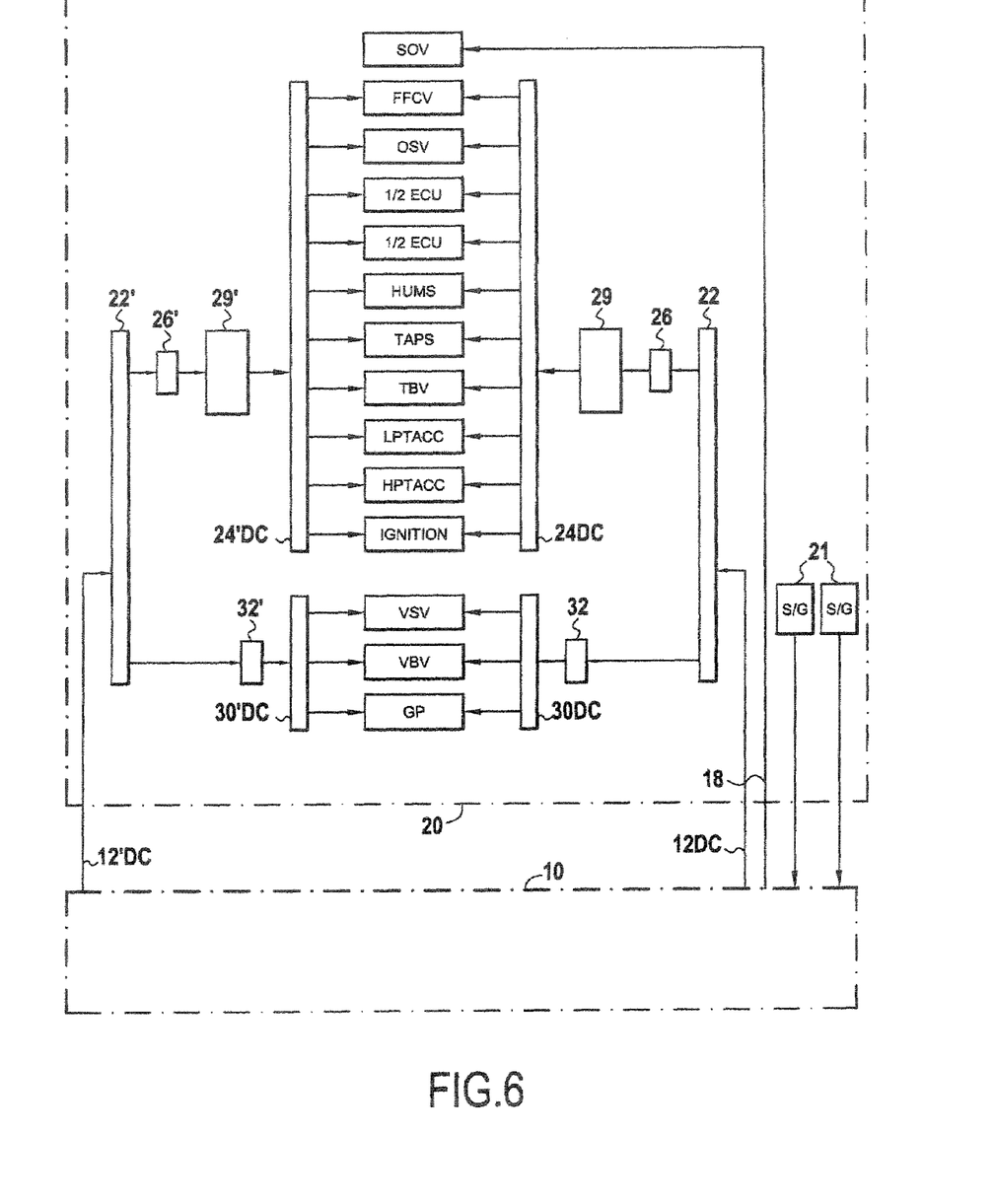

In the embodiment of FIG. 6, the power supply lines 12, 12' deliver DC directly to the DC buses 22, 22, of the airplane electricity power supply circuit. A first DC distribution bus 24DC is connected to the bus 22 via a circuit breaker 26 and a voltage converter 29 transforming the DC of the bus 22 (e.g. at 270 Vdc of a network on board an airplane) into a lower DC voltage (e.g. 28 Vdc). A second DC distribution bus 30DC is connected to the bus 22 via a circuit breaker 32. In similar manner, a DC distribution bus 24'DC is connected to the bus 22' via a circuit breaker 26' and a voltage converter 29', while a DC distribution bus 30'DC is connected to the bus 22' via a circuit breaker 321. The equipment powered by the buses 24'DC and 30'DC is the same as the equipment powered by the buses 24DC and 30DC.

It should be observed that in the embodiment of FIG. 6, the buses 30DC and 30'DC could be connected to the buses 22 and 22' via converters if the voltages desired on the buses 30DC and 30'DC are different from the voltage available on the buses 22 and 22'.

The particular embodiment selected from those described above is a function of the voltage available from the network on board the airplane and the power supply desired for controlling the operation of the engine equipment.

The operation of certain pieces of equipment requires no more than an electricity power supply. In the examples shown, this applies to the 1/2 ECUs and to the HUMS that are powered in parallel by the buses 24AC, 24DC or 24'AC, 24'DC.

One or more other pieces of equipment operate, requiring no more than electricity to be supplied to an excitation circuit. In the example shown in FIG. 7, this applies to the spark plug of the ignition circuit, which spark plug is connected to an electronic exciter circuit TC powered in parallel by the buses 24, 24' (i.e. 24AC or 24DC and 24'AC or 24'DC). The circuit TC may optionally be duplicated for redundancy purposes.

Figure 7:
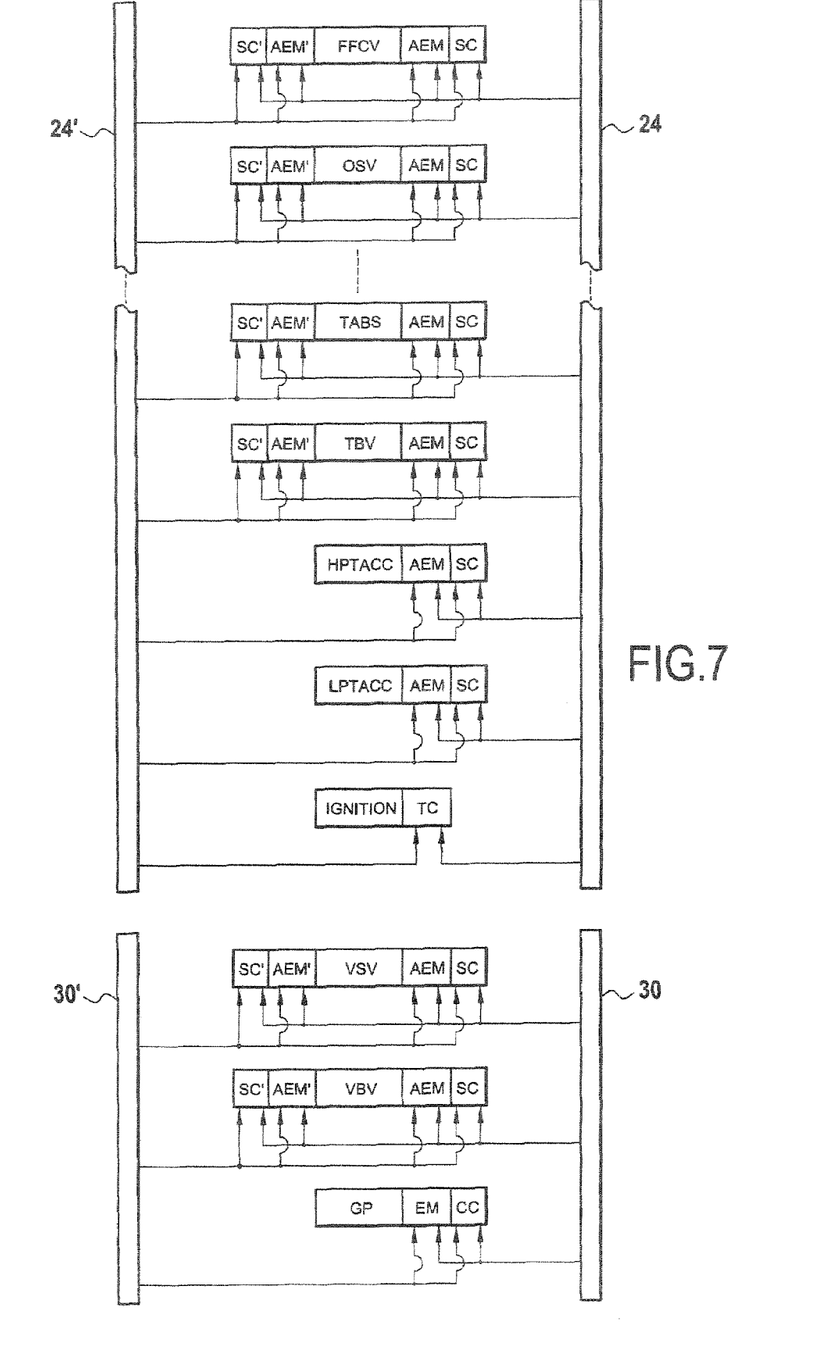
FIG. 7 shows a portion of the electricity power supply circuit of FIGS. 2 to 6 in greater detail.

The operation of the electric pump GP requires an electric motor EM and an electronic control circuit CC for controlling the motor EM (FIG. 7). The electric motor EM is powered in parallel by the buses 30 and 30, (i.e. 30AC or 30DC and 30'AC or 30'DC). The windings of the motor EM may optionally be duplicated by way of redundancy, as may the associated electronic control circuit CC.

The operation of one or more remaining pieces of equipment is controlled by an electromechanical actuator comprising drive means such as an electric actuator, a motor, or a coil. This applies in particular to the following items: FFCV, OSV, TAPS, TBV, HPTACC, LPTACC, VSV, and VBV. When safety in operation requires it, an electromechanical actuator is duplicated for redundancy purposes. This may apply in particular to the following items: FFCV, OSV, TBV, VSV, and VBV which are shown in FIG. 7 as having redundant electromechanical actuators AEM and AEM'. Each actuator is powered in parallel by the buses 24, 24' or by the buses 30, 30'. In other cases, a single electromechanical actuator AEM can be provided, e.g. for the items HPTACC and LPTACC, the actuator being powered in parallel by the buses 24, 24'.

Pieces of equipment presenting adjustable positioning may also be associated with servo-control circuits serving to maintain their real positions as detected by sensors matching corresponding setpoint positions. This can apply for example to the following items: FFCV, VSV, VBV, HPTACC, and LPTACC, having electromechanical actuators AEM and possibly also AEM' controlled by respective electronic servo-control circuits SC and SC'. This may also apply to the item OSV, as in the example shown, if provision is made to regulate fuel flow rate over a restricted range after over-speed or over-thrust has been detected.

In the example shown, the electronic circuits TC, CC, SC, and SC' are implanted locally in the vicinity of the associated pieces of equipment or they are integrated therein. The circuits TC, CC, SC, and SC, are powered in parallel by the buses 24, 24' or 30, 30' and they are connected to the items 1/2 ECU via connections (not shown) for receiving control information or setpoint information as delivered by that one of the two items 1/2 ECU that is active. It should be observed that an electronic circuit of a piece of equipment that is powered by an AC bus could itself be powered by a DC bus. Implanting electronic circuits within the various pieces of equipment can serve to lighten the items 1/2 ECU.

Nevertheless, as a variant, the functions of one or more electronic circuits TC, CC, SC, or SC' could be implanted in the 1/2 ECU items by providing suitable connections between those items and the motors or actuators concerned.

It should also be observed in FIGS. 2 to 6 that a line 18 directly connects the electricity distribution network of the airplane to a fuel shutoff valve (SOV) serving to enable the engine to be turned off directly from the airplane cockpit or from the automatic control system of the engine.

Figure 8:
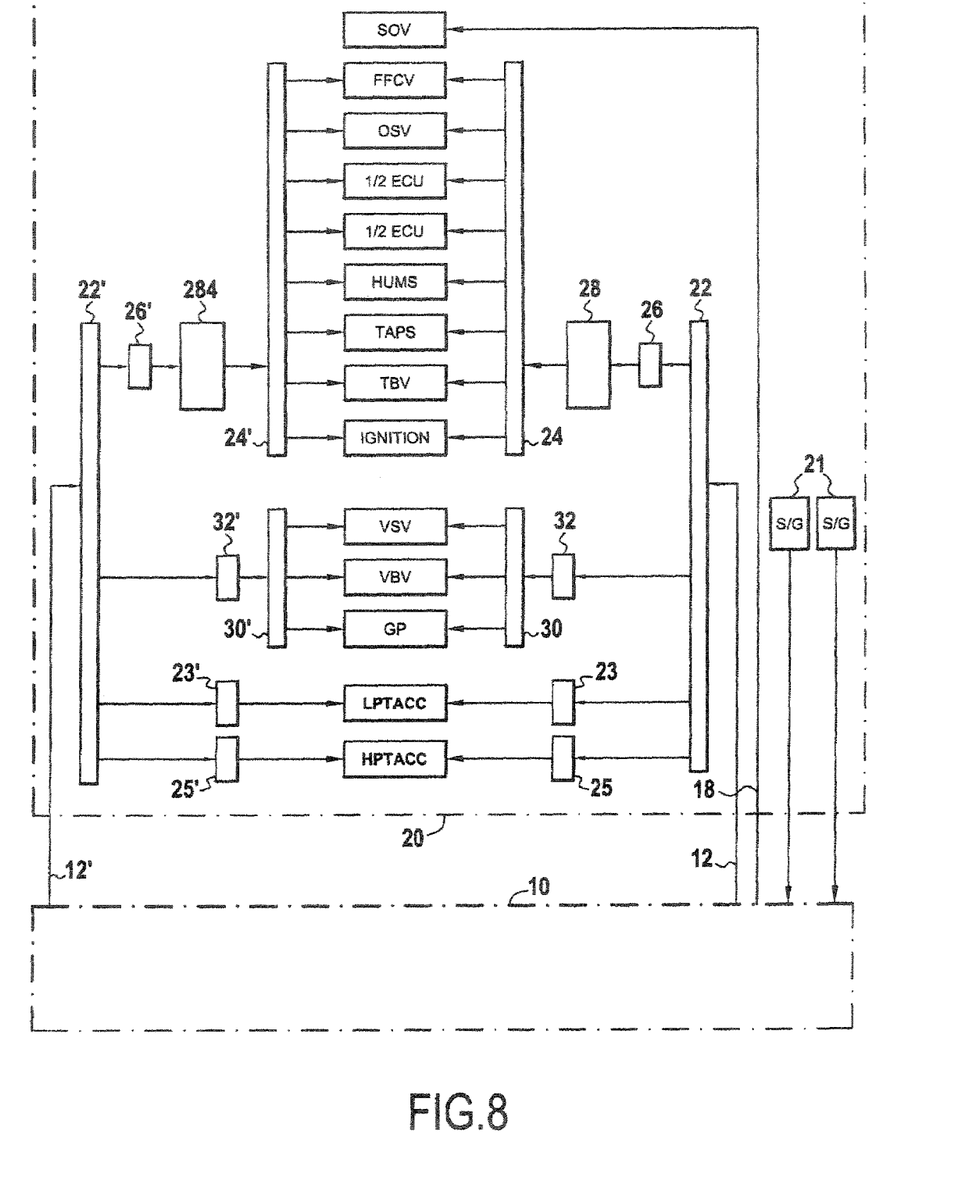
FIGS. 8 and 9 are highly diagrammatic and show two variant embodiments of the FIG. 2 electricity power supply circuit.

In the above, it is assumed that the LPTACC and HPTACC functions are performed by controlling the flow rate of air that impacts against turbine ring sectors to control dimensional variations by acting on the temperatures of the ring sectors. In a variant, the same functions can be provided in known manner by resistive heater systems acting on projections from the ring support casing. As shown in FIG. 8, the LPTACC and HPTACC systems can be powered directly in parallel by the buses 22, 22', with circuit breakers 23, 23' and 25, 25' being interposed. Switch circuits (not shown) are associated with the LPTACC and HPTACC systems and are controlled by the 1/2 ECUs to control the supply of power by the buses 22, 22', or the interruption of said power supply.

Although FIG. 8 shows one variant embodiment for the power supply circuit of FIG. 2, this same variant could be applied in the same manners as in the embodiments of FIGS. 3 to 6.

Compared with the usual prior art, an advantage of the invention is to provide electricity power supplies that are common to different pieces of electrical equipment of the engine.

Another particular advantage of the electricity power supply circuit shown is that the electricity needed by the engine electrical equipment is taken from the electricity distribution network of the airplane. This does not present any particular handicap, providing the power available on the airplane electricity distribution network is large so as do be capable of handling the increasing electricity needs of airplane equipment, meaning that the power needs of the engine represent only a small fraction of that power.

Figure 9:
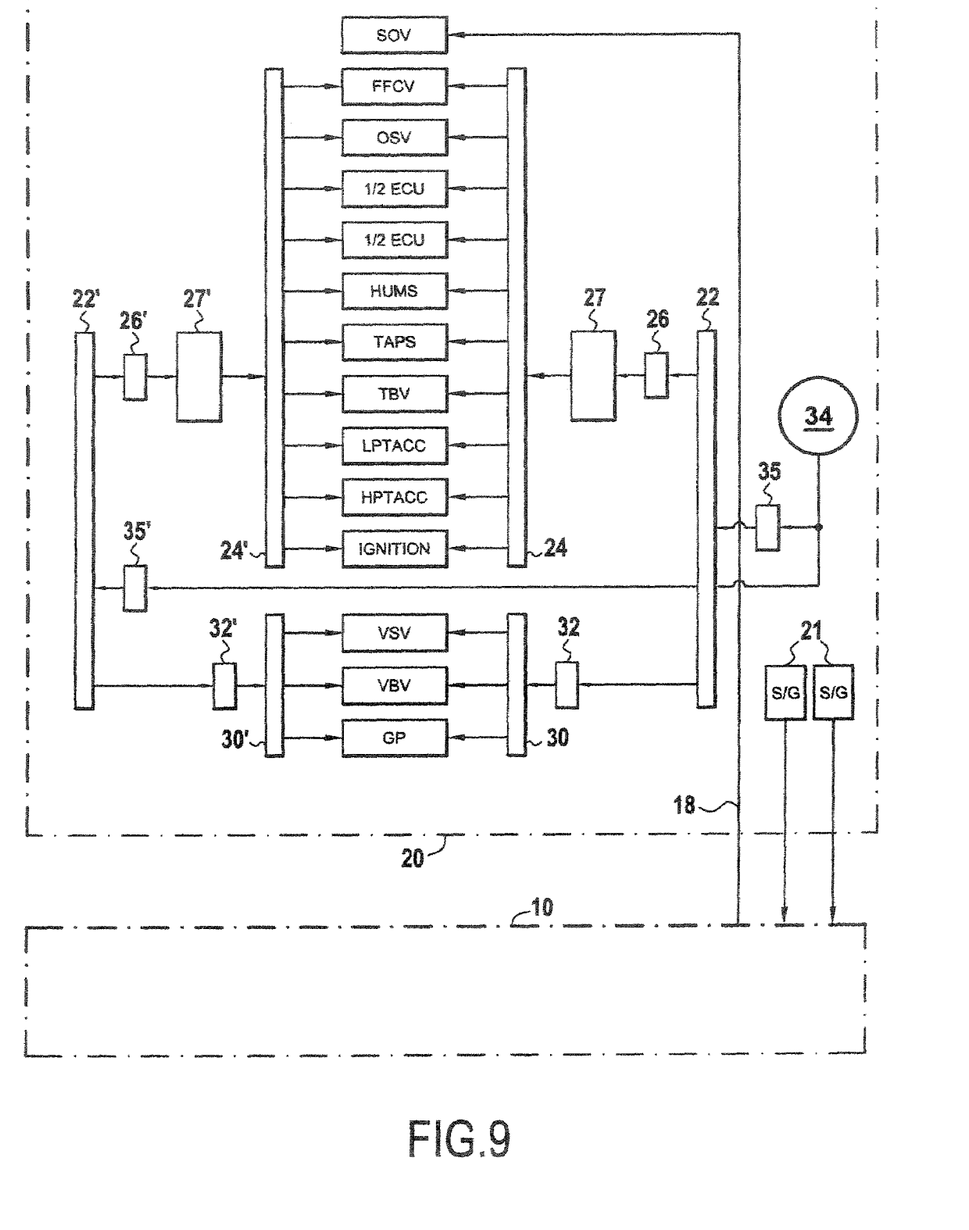

In a variant, as shown in FIG. 9, it is nevertheless possible to power the bus 22 (and the bus 22') directly from at least one redundant generator 34 specific to the engine and driven thereby, circuit breakers 35, 35' being inserted on the lines connecting the generator 34 to the buses 22 and 22', with the lines 12 and 12, being omitted.

The generator 34 delivering AC or DC depending on circumstances could be used not only with the embodiment of FIG. 2 (as shown in FIG. 9), but also with the embodiments of FIGS. 3 to 6.

The invention claimed is:

1. A device for supplying electricity power to and actuating equipments of a gas turbine airplane engine, comprising:
   an electricity power supply circuit dedicated to the engine and distinct from an electricity network on board of the airplane and circuits for excitation, control or servo-control of pieces of electrical equipment of the engine,
   the engine electricity power supply circuit comprising:
      a first bus configured to distribute DC or AC voltage to circuits for excitation, control or servo-control of first pieces of electrical equipment of the engine,
      a second bus configured to distribute DC or AC voltage to circuits for excitation, control or servo-control of second pieces of electrical equipment of the engine which require a higher electrical power than the first pieces of equipment, and
      a third bus that includes a connection configured to receive power from an electricity source and connected to the first bus and to the second bus for supplying the first bus and second bus with electric power,
      wherein the third bus is connected to receive electric power from the electricity distribution network on board of the airplane.

2. A device according to claim 1, in which the third bus is connected to receive electric power from an electricity generator dedicated to the engine electricity power supply circuit and driven by the engine.

3. A device according to claim 1, in which the first bus is connected to the third bus via at least one voltage converter or transformer.

4. A device according to claim 1, in which the second bus is connected to the third bus via at least one voltage converter or transformer.

5. A device according to claim 1, in which the first pieces of electrical equipment of the engine are pieces that require electricity at a power of less than 100 W.

6. A device according to claim 1, in which the first pieces of electrical equipment of the engine comprise at least one item selected from an electronic regulator module for the engine, valves for controlling an overall flow rate of fuel delivered to the engine, a system for managing health and usage of members of the engine, compressor transient bleed valves, valves for controlling a flow rate of fuel delivered to combustion chamber injectors of the engine, valves for controlling air flow rate to adjust clearance at the tips of turbine blades, or a device for igniting combustion.

7. A device according to claim 1, in which the second pieces of electrical equipment of the engine comprise at least one item selected from: devices for controlling a pitch angle of variable pitch vanes, adjustable bleed valves for a compressor, or a pump of a circuit for supplying fuel to the engine.

8. A device according to claim 1, in which at least some of the circuits for excitation, control, or servo-control are implanted locally with corresponding of the pieces of electrical equipment.

9. A device according to claim 8, in which at least some of the circuits for excitation, control or servo-control are integrated in corresponding of the pieces of equipment.

10. A device according to claim 1, in which systems configured to adjust clearance at tips of turbine blades comprise electrical heater devices powered directly from the third bus.

11. A device according to claim 1, in which the first bus and the second bus are independently connected to the third bus.

12. A device according to claim 1, in which a fuel shutoff valve is directly connected to the electricity distribution network of the airplane.

* * * * *